United States Patent
Saitou et al.

(10) Patent No.: US 8,770,942 B2
(45) Date of Patent: Jul. 8, 2014

(54) BLADE AND LAMINATED PROTECTIVE SHEET FOR THE BLADE

(75) Inventors: Hitoshi Saitou, Saitama (JP); Takato Nakamura, Saitama (JP); Nobuaki Suzuki, Saitama (JP)

(73) Assignee: Fujikura Rubber Ltd, Tokyo (JP)

(*) Notice: Subject to any disclaimer, the term of this patent is extended or adjusted under 35 U.S.C. 154(b) by 0 days.

(21) Appl. No.: 13/807,127

(22) PCT Filed: Jan. 25, 2012

(86) PCT No.: PCT/JP2012/051511
§ 371 (c)(1),
(2), (4) Date: Dec. 27, 2012

(87) PCT Pub. No.: WO2012/102294
PCT Pub. Date: Aug. 2, 2012

(65) Prior Publication Data
US 2013/0101426 A1    Apr. 25, 2013

(30) Foreign Application Priority Data
Jan. 26, 2011    (JP) .................... 2011-013825

(51) Int. Cl.
*F01D 5/28* (2006.01)
*F03D 11/00* (2006.01)

(52) U.S. Cl.
USPC .................... 416/224; 416/241 A; 416/62

(58) Field of Classification Search
USPC ............ 416/62, 224, 228, 229 R, 230, 231 R, 416/231 B, 241 R, 241 A, 241 B
See application file for complete search history.

(56) References Cited

U.S. PATENT DOCUMENTS

| | | | |
|---|---|---|---|
| 1,490,256 A | | 4/1924 | Caldwell et al. |
| 3,825,371 A | * | 7/1974 | Roder et al. .................. 416/224 |
| 3,895,835 A | * | 7/1975 | Thomson ...................... 293/122 |
| 4,648,921 A | * | 3/1987 | Nutter, Jr. ....................... 156/77 |
| 4,895,491 A | * | 1/1990 | Cross et al. ................... 416/224 |
| 5,108,262 A | | 4/1992 | Crane ............................ 416/230 |
| 5,123,814 A | * | 6/1992 | Burdick et al. ............... 416/224 |
| 5,346,367 A | * | 9/1994 | Doolin et al. ................. 416/230 |

(Continued)

FOREIGN PATENT DOCUMENTS

| | | |
|---|---|---|
| CN | 101679048 A | 3/2010 |
| CN | 101778916 A | 7/2010 |

(Continued)

OTHER PUBLICATIONS

International search report for PCT/JP2012/051511 dated Apr. 23, 2012.

(Continued)

*Primary Examiner* — Ned Landrum
*Assistant Examiner* — Joshua R Beebe
(74) *Attorney, Agent, or Firm* — McCormick, Paulding & Huber LLC

(57) ABSTRACT

A scratch-resistant blade such as an FRP wind turbine blade and a blade protective sheet which can be easily repaired when scratched. A blade is provided with a laminated protective sheet bonded to at least part of a leading edge of an FRP blade body of said blade, wherein the laminated protective sheet comprises an adhesive layer, a intermediate fabric layer and a durable surface layer, in that order from the blade body.

15 Claims, 9 Drawing Sheets

(56) References Cited

U.S. PATENT DOCUMENTS

| | | | | |
|---|---|---|---|---|
| 5,486,096 | A | * | 1/1996 | Hertel et al. .................. 416/224 |
| 5,562,265 | A | * | 10/1996 | Rauckhorst, III ......... 244/134 R |
| 5,904,322 | A | * | 5/1999 | Giamati et al. ........... 244/134 B |
| 5,908,522 | A | * | 6/1999 | Lofstrom et al. ............... 156/94 |
| 6,341,747 | B1 | * | 1/2002 | Schmidt et al. ............ 244/123.1 |
| 2004/0096331 | A1 | * | 5/2004 | Leach ........................... 416/224 |
| 2005/0169763 | A1 | * | 8/2005 | Anning ........................ 416/224 |
| 2008/0107540 | A1 | * | 5/2008 | Bonnet .................... 416/229 R |
| 2008/0159870 | A1 | * | 7/2008 | Hong ........................... 416/224 |
| 2008/0268258 | A1 | | 10/2008 | Verma et al. |
| 2009/0039200 | A1 | * | 2/2009 | Marx et al. ................ 244/134 E |
| 2012/0034833 | A1 | | 2/2012 | Schaube et al. |

FOREIGN PATENT DOCUMENTS

| | | | |
|---|---|---|---|
| DE | 20 2009 006 966 U1 | 10/2010 | |
| DE | 10 2009 022 980 A1 | 12/2010 | |
| JP | 09-295379 A | 11/1997 | |
| JP | 2002-322998 A | 11/2002 | |
| JP | 2004-293455 A | 10/2004 | |
| JP | 2007-009926 A | 1/2007 | |
| JP | 2010-006925 A | 1/2010 | |
| JP | 2010-150451 A | 7/2010 | |
| JP | 2010-235771 A | 10/2010 | |
| WO | WO2008/145618 | * 12/2008 | ............ C01B 33/113 |
| WO | 2010117262 A1 | 10/2010 | |
| WO | WO2010/117262 | * 10/2010 | ................ F01D 5/28 |
| WO | 2010136309 A1 | 12/2010 | |

OTHER PUBLICATIONS

Supplemental European Search Report dated Oct. 22, 2013 for PCT/JP2012/051511.

* cited by examiner

BLADE AND LAMINATED PROTECTIVE SHEET FOR THE BLADE

CROSS REFERENCE TO RELATED APPLICATIONS

This application claims the priority of Japanese patent application No. 2011-013825, filed on Jan. 26, 2011 and PCT Application No. PCT/JP2012/051511, filed on Jan. 25, 2012, the disclosures of which are incorporated herein by reference in their entirety.

TECHNICAL FIELD

The present invention relates to a blade and a laminated protective sheet for the blade.

BACKGROUND ART

As a blade, for instance, wind turbine blades of a wind power generator are exposed to flying objects, including hail, and thunderbolts in a natural environment. In addition, the tips of the wind turbine blades rotate at high speed, reaching 60 meters per second, and accordingly, the leading edges in particular are subject to the harshest of conditions. Conventionally, most wind turbine blades are made of fiber-reinforced plastic (FRP), especially glass-fiber-reinforced plastic (GFRP) that is made of an epoxy resin containing glass fibers, and the surfaces thereof are covered by a gel coating. However, the surface gel coating peels off due to flying objects and thunderbolts, and if rain water penetrates the blades through cracks in the blades created by the flying objects and thunderbolts, there is a possibility of the blades falling into disrepair in the worst case scenario. Even if such cracks are small, as a result of the blades being subject to a natural environment for a long period of time, degeneration caused by ultraviolet rays may develop if the epoxy resin is exposed through the cracks.

SUMMARY OF INVENTION

Technical Problem

Due to this reason, a method of shielding/repairing a blade United States Patent Publication 2008/159870A1 and a wind turbine generator allowing wind turbine blades to be easily repaired Japanese Unexamined Patent Publication No. 2004-293455 have been proposed. However, both of them are for wind turbine generators already installed, and furthermore, a great deal of cost is required because a plurality of (a great number of) repairing processes is required or wind turbine generators (wind turbine blades) are enormous in size. Blades of some helicopters and airplanes, the speed of the edges of which reaches several times of the speed of the edges of wind turbine blades, are made of GFRP, thus having similar problems.

The present invention has been devised in view of the above described problems, and an object of the present invention is to achieve a scratch-resistant FRP blade and a blade protective sheet which can be easily repaired when scratched.

SUMMARY OF THE INVENTION

The present invention has been accomplished based on the findings that, if a protective sheet which is superior in shock resistance, tracking resistance and ozone resistance and easy to bond is affixed to at least the leading edge of an FRP blade body in advance, a blade which is scratch-resistant and maintenance-free for a long period of time can be achieved.

A blade according to an aspect of the present invention is characterized by a laminated protective sheet being bonded (joined) to at least part of the leading edge of an FRP blade body of the blade, and the laminated protective sheet includes an adhesive layer, a intermediate fabric layer and a durable surface layer, in that order from the blade body side.

In this specification, the term "made of FRP" refers to being made of fiber-reinforced plastic and is used as a concept including being made of glass-fiber-reinforced plastic (GFRP) and being made of carbon-fiber-reinforced plastic (CFRP).

The leading edge of the blade body has a circular arc shape in a cross section orthogonal to the longitudinal direction of the blade body; in addition, the distal end of the leading edge which is farthest from a rotational center of the blade body includes a tapered distal end, having a narrowing thickness in cross section orthogonal to the longitudinal direction of the blade body and having a narrowing width in the cross section from the leading edge to the trailing edge of the blade body. On this tapered distal end, air resistance caused by rotations of the blade when rotating acts locally; hence, the tapered distal end is a portion of the leading edge which is subject to the harshest conditions out of the entire leading edge. Accordingly, it is desirable that the laminated protective sheet be bonded to the tapered distal end of the leading edge of the blade body over two sides (the winding receiving surface and the back surface of the blade when it rotates) thereof that extend toward the trailing edge from a generating line of the arc-shaped cross section. With this structure, the tapered distal end of the leading edge can be protected in an efficient manner.

In this specification, the term "generating line of the arc-shaped cross section of the leading edge" refers to a line which passes through the apex of a circular arc of the leading edge and extends in the longitudinal direction of the blade body as viewed in a cross sectional profile of the leading edge that is orthogonal to the longitudinal direction of the blade body.

It is desirable for a distal end of the laminated protective sheet that is farthest from the rotational center of the blade body is in the shape of a curved surface which is convex toward the distal end of the laminated protective sheet and which extends continuously over the two sides of the blade body.

This makes the pressure (wind power resistance) which is caused by airflow when the blade rotates easy to escape, thus making it possible to securely prevent the laminated protective sheet from peeling off the tapered distal end of the leading edge.

Alternatively, it is possible for a distal end of the laminated protective sheet that is farthest from the rotational center of the blade body to be in the shape of a curved surface which is concave toward the distal end of the laminated protective sheet and which extends continuously over the two sides of the blade body.

This makes it possible to secure a large bonding area for the laminated protective sheet to the blade body.

It is desirable for the laminated protective sheet to include a slit for making the laminated protective sheet follow a shape of the tapered distal end with no gaps or wrinkles when bonded to the tapered distal end.

The laminated protective sheet can be suitably bonded to a plurality of blade bodies, the tapered distal ends of which are mutually different in shape.

It is possible for a laminated protective sheet holding recess, which corresponds in shape to the laminated protective sheet and has substantially the same depth as a thickness of the laminated protective sheet, to be formed at the tapered distal end of the blade body, the laminated protective sheet being positioned in the laminated protective sheet holding recess and bonded therein.

This structure substantially eliminates any unevenness created by the thickness of the laminated protective sheet, thus making it possible to prevent the laminated protective sheet from peeling which may be caused by the pressure (wind power resistance) caused by airflow when the blade rotates.

A blade according to another aspect of the present invention is characterized by a laminated protective sheet being bonded to a surface of an FRP blade body of the blade, wherein a leading edge of the blade body has a circular arc shape in a cross section orthogonal to a longitudinal direction of the blade body, wherein a distal end of the leading edge, which is farthest from a rotational center of the blade body, includes a tapered distal end, having a narrowing thickness in cross section orthogonal to the longitudinal direction of the blade body and having a narrowing width in the cross section from the leading edge to a trailing edge of the blade body, and wherein the laminated protective sheet is bonded to the tapered distal end of the leading edge of the blade body over two sides thereof that extend toward the trailing edge from a generating line of the arc-shaped cross section.

A laminated protective sheet for a blade according to an aspect of the present invention is characterized in by the laminated protective sheet including an adhesive layer, a intermediate fabric layer and a durable surface layer, in that order from the blade body side.

A laminated protective sheet according to another aspect of the present invention which is for a blade and is bonded to a surface of an FRP blade body, is characterized by a leading edge of the blade body has a circular arc shape in a cross section orthogonal to a longitudinal direction of the blade body, wherein a distal end of the leading edge, which is farthest from a rotational center of the blade body, includes a tapered distal end, having a narrowing thickness in cross section orthogonal to the longitudinal direction of the blade body and having a narrowing width in the cross section from the leading edge to a trailing edge of the blade body. The laminated protective sheet is characterized by the laminated protective sheet including an adhesive layer, a intermediate fabric layer and a durable surface layer, in that order from the blade body side, the laminated protective sheet being bonded to the tapered distal end of the leading edge of the blade body over two sides thereof that extend toward the trailing edge from a generating line of the arc-shaped cross section, and a distal end of the laminated protective sheet that is farthest from the rotational center of the blade body being in the shape of a curved surface which is convex toward the distal end of the laminated protective sheet and which extends continuously over the two sides of the blade body.

A laminated protective sheet according further aspect of the present invention which is for a blade and bonded to a surface of an FRP blade body is characterized by a leading edge of the blade body having a circular arc shape in a cross section orthogonal to a longitudinal direction of the blade body, wherein a distal end of the leading edge, which is farthest from a rotational center of the blade body, includes a tapered distal end, having a narrowing thickness in cross section orthogonal to the longitudinal direction of the blade body and having a narrowing width in the cross section from the leading edge to a trailing edge of the blade body. The laminated protective sheet is characterized by the laminated protective sheet including an adhesive layer, a intermediate fabric layer and a durable surface layer, in that order from the blade body side, the laminated protective sheet being bonded to the tapered distal end of the leading edge of the blade body over two sides thereof that extend toward the trailing edge from a generating line of the arc-shaped cross section, and a distal end of the laminated protective sheet that is farthest from the rotational center of the blade body being in the shape of a curved surface which is concave toward the distal end of the laminated protective sheet and which extends continuously over the two sides of the blade body.

It is desirable for the laminated protective sheet for a blade to include a slit for making the laminated protective sheet follow a shape of the tapered distal end with no gaps or wrinkles when the laminated protective sheet is bonded to the tapered distal end.

With this structure, the laminated protective sheet can be suitably bonded to a plurality of blade bodies, the tapered distal ends of which are mutually different in shape.

The durable surface layer is a layer which is subject to the harshest conditions in a natural environment. For this reason, it is desirable that the durable surface layer be composed using a rubber layer which includes a shock-weather resistant rubber as a rubber component such as hydrogenated acrylonitrile-butadiene rubber (hydrogenated nitrile rubber, HNBR) as a material superior in shock resistance, tracking resistance and ozone resistance. Among others, a rubber layer including hydrogenated nitrile rubber as a rubber component is the most desirable rubber layer. It is desirable that the thickness of the durable surface layer be approximately 0.5±0.2 mm. If the thickness is under this range, sufficient durability cannot be obtained. If the thickness is over this range, it is difficult to obtain the effect of preventing deviation between layers from occurring by the intermediate fabric layer; in addition, the operability (followability for a blade-shaped surface having a curved surface) deteriorates. Moreover, an excessive load acts on the blade itself due to an increase in weight caused by an increase in thickness, so that a problem arise in which the blade easily deteriorates.

As a layer superior in adhesive property to a top coat layer or a gel coat layer which is formed on the surface of the FRP-made blade, it is desirable that the adhesive layer be composed of a rubber layer which includes butyl rubber (IIR) as a rubber component. To obtain sufficient adhesive properties, shock-absorbing properties (energy absorbing capability) and deviation prevention capability with respect to the blade, it is desirable that the thickness of the adhesive layer be in the range approximately from 0.5 to 1.0 mm.

The intermediate fabric layer has the role of preventing deviation between layers when an impact is exerted on the durable surface layer, and is formed as a layer which includes a fabric impregnated with rubber such as nitrile rubber (NBR). However, considering adhesive properties with the durable surface layer, it is desirable that the rubber used in the intermediate fabric layer be a rubber having similar properties to the rubber used in the durable surface layer. If the intermediate fabric layer does not exist, deviation between the durable surface layer and the adhesive layer (wrinkles of the durable surface layer) easily occurs, which results in a lack of durability. It is desirable that the fabric be made as a plain weave fabric. Although the fibers to be used in the fabric are optional, for example, aramid fibers or nylon fibers can be used. The thickness of the intermediate fabric layer is desirably in the range of 0.3±0.05 mm. If the thickness is over or under this range, a sufficient effect of preventing deviation between layers from occurring cannot be obtained. If the thickness is over this range, the operability (shape followability) deteriorates and deviation easily occurs.

The above described durable surface layer, intermediate fabric layer and adhesive layer are separately formed into sheets, and are laminated and bonded together to be formed into a laminated protective sheet. Release paper can be affixed to the surface of the adhesive layer.

The laminated protective sheet according to the present invention is bonded to at least part of the leading edge of an FRP-made blade body. The laminated protective sheet can be bonded to the entire part of the leading edge; however, in the case of a rotor like a wind turbine blade or a helicopter blade, the laminated protective sheet can be bonded only to a portion of the leading edge on the distal end side which is higher in peripheral speed.

Effects of Invention

The durability of the blade according to the present invention can be increased because a laminated protective sheet that includes an adhesive layer, a intermediate fabric layer and a durable surface layer is bonded to at least part of the leading edge of an FRP-made blade body. In addition, the laminated protective sheet according to the present invention can be used to repair damaged parts of an FRP-made blade by bonding the laminated protective sheet to a surface of the FRP-made blade.

BRIEF DESCRIPTION OF THE DRAWINGS

FIG. 1 is a conceptual diagram while FIG. 4 is a detailed enlarged view, the shapes shown in both drawings do not precisely match each other;

FIG. 1 is a conceptual diagram while FIG. 7 is a detailed enlarged view, the shapes shown in both drawings do not precisely match each other;

DESCRIPTION OF THE PREFERRED EMBODIMENTS

Figure 1:
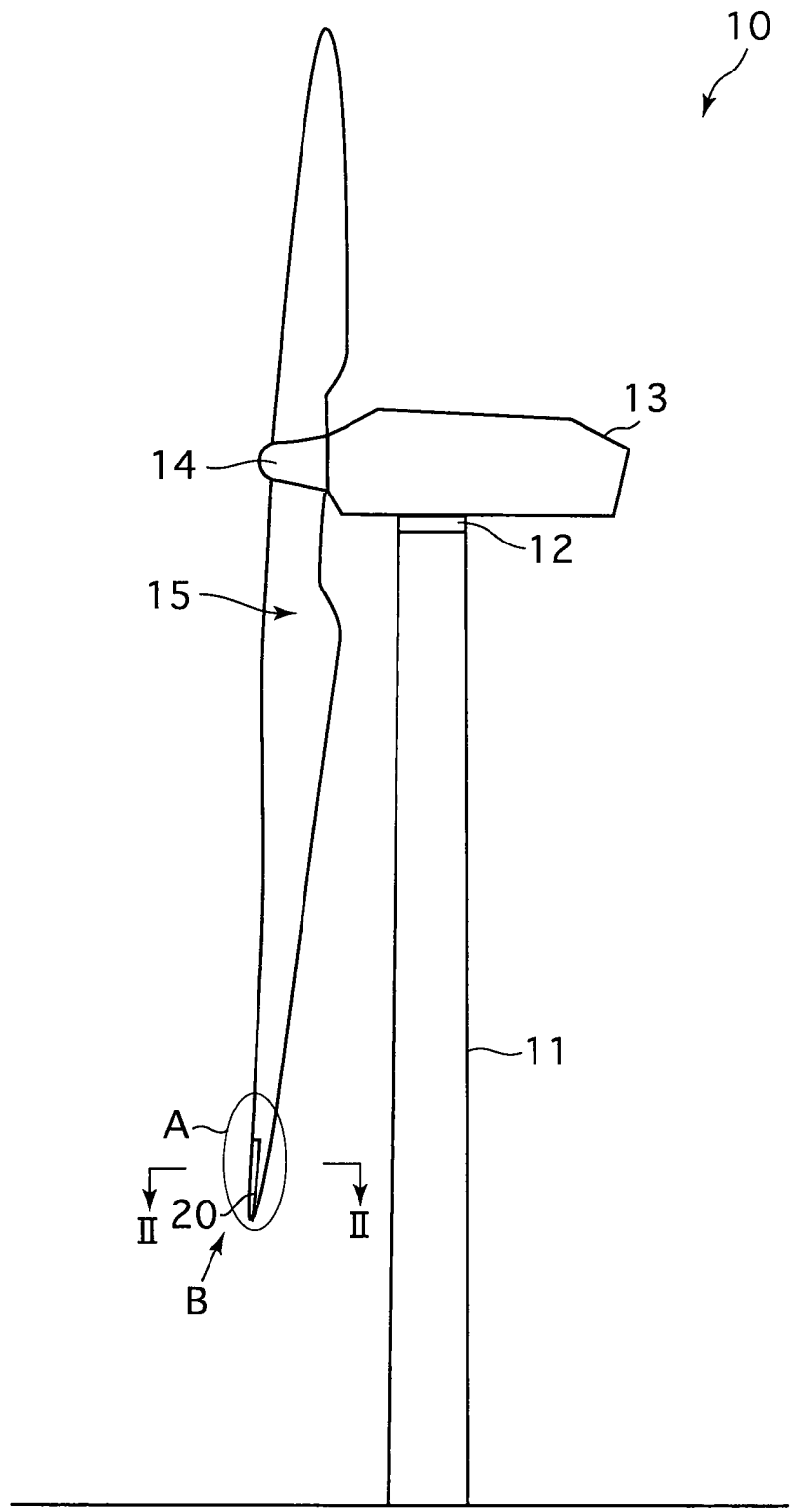
FIG. 1 is a side elevational view (at the time of maintenance) of a wind turbine generator provided with wind turbine blades to which a laminated protective sheet for a blade according to the present invention is bonded.

FIG. 1 shows a wind turbine generator 10 provided with wind turbine blades (blade/blade body) 15, each of which a laminated protective sheet 20 according to the present invention is bonded (note that FIG. 1 shows a state at the time of maintenance, so that the leading edge of each wind turbine blade 15 is facing forward (parallel to the plane of FIG. 1)). In the wind turbine generator 10, a nacelle 13 capable of turning horizontally is fixed to the top of a columnar tower 11 via a yaw system 12. A speed-up gear, an electricity generator and a controller, etc., (not shown) are contained in the nacelle 13, and a hub 14 which rotates about an axis inclined with respect to a horizontal axis at a predetermined tilt angle is fixed to a horizontal end of the nacelle 13. The hub 14 is connected to the speed-up gear contained in the nacelle 13, so that rotation of the hub 14 is increased and transmitted to the electricity generator. Three wind turbine blades 15 are installed and arranged at regular intervals so as to project in radial directions from the hub 14 and rotate in a plane inclined to a vertical axis. When the wind turbine blades 15 are rotated by the wind, the hub 14 rotates. The wind turbine blades 15 are made of, e.g., a glass-fiber-reinforced composite (GFRP: Glass Fiber Reinforced Plastic) made of an epoxy resin in which glass fibers are included.

The structure of the wind turbine blade 15 will hereinafter discussed in detail with reference to FIGS. 2 through 5. The wind turbine blade 15 includes a leading edge 16, a trailing edge 17 and a shell portion 18 which connects the leading edge 16 and the trailing edge 17 to each other.

Figure 2:
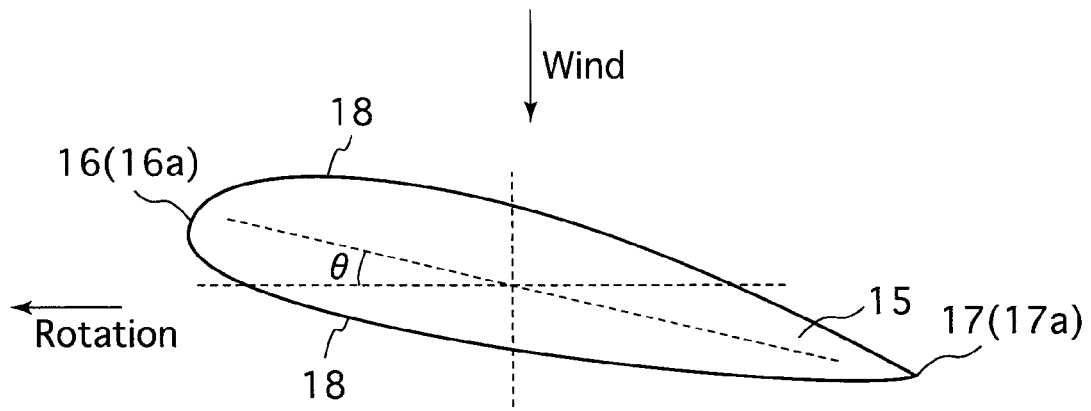
FIG. 2 is a sectional view taken along the line II-II shown in FIG. 1, showing the structure of a single wind turbine blade when in use (during rotation)

As shown in FIG. 2, the leading edge 16 is the front edge that is first to receive air resistance that is generated by rotation of the wind turbine blade 15 when the wind turbine blade 15 is in operation (rotation). The wind turbine blade 15 is configured so that the orientation thereof can be freely changed (turned). The wind turbine blade 15 can be adjusted so as to easily receive aerodynamic lift due to wind (natural wind) by changing the orientation of (by turning) the wind turbine blade 15 by a predetermined angle θ (e.g., θ=12°, 30°). On the other hand, the leading edge 16 faces toward the front of the wind turbine blade 15 as shown in FIG. 1 when maintenance is carried out on the wind turbine blade 15 as shown in FIG. 3.

Figure 3:
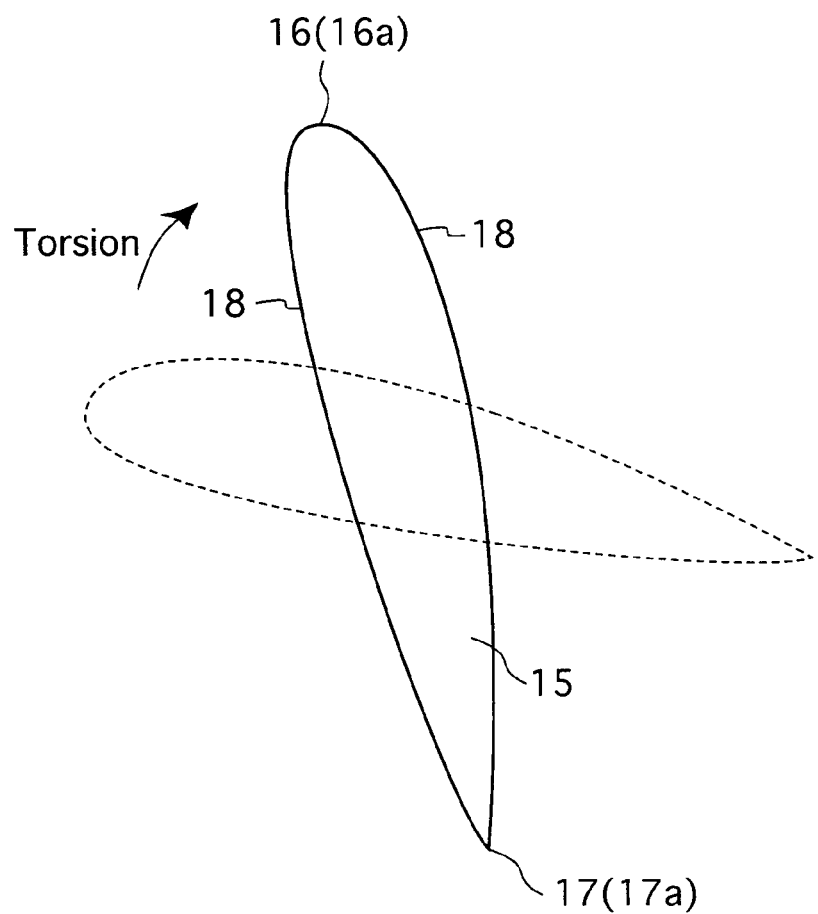
FIG. 3 is a sectional view taken along the line II-II shown in FIG. 1, showing the structure of a single wind turbine blade at the time of maintenance.
Figure 4:
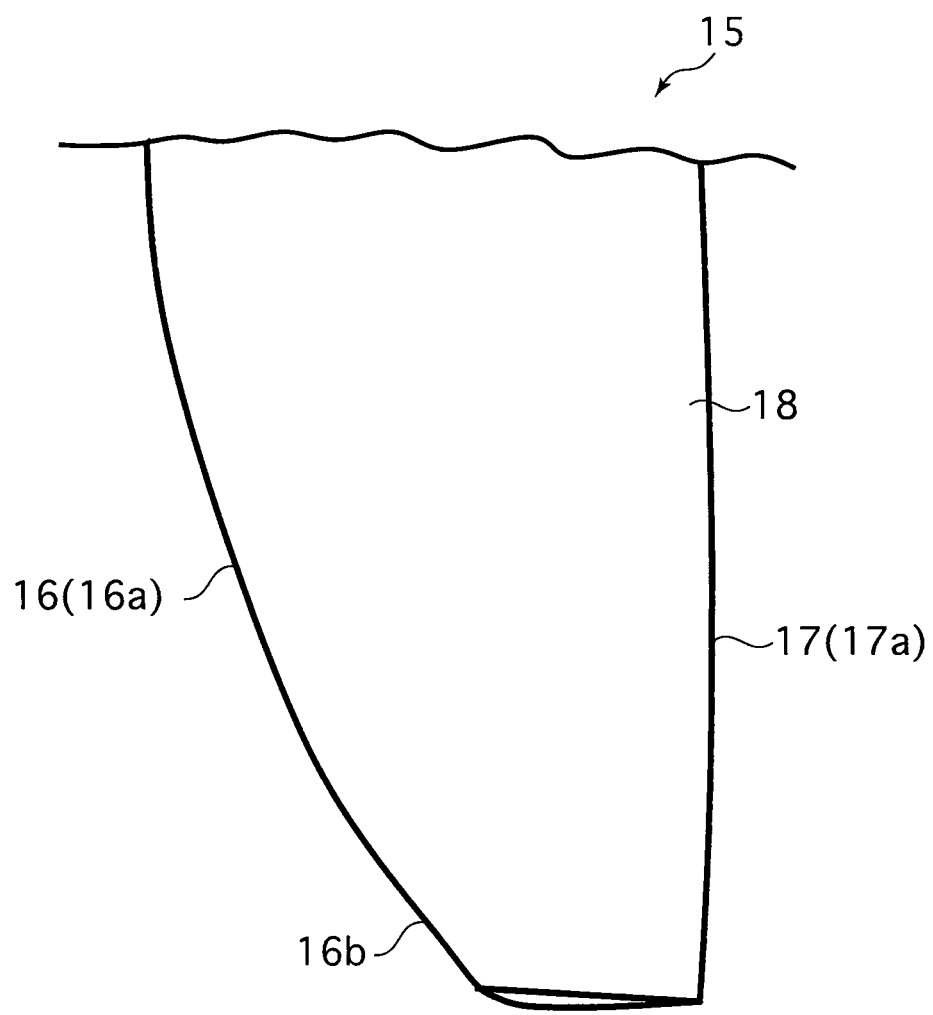
FIG. 4 is an enlarged view of a portion "A" shown in FIG. 1, showing the structure of a single wind turbine blade; however, since
Figure 5:
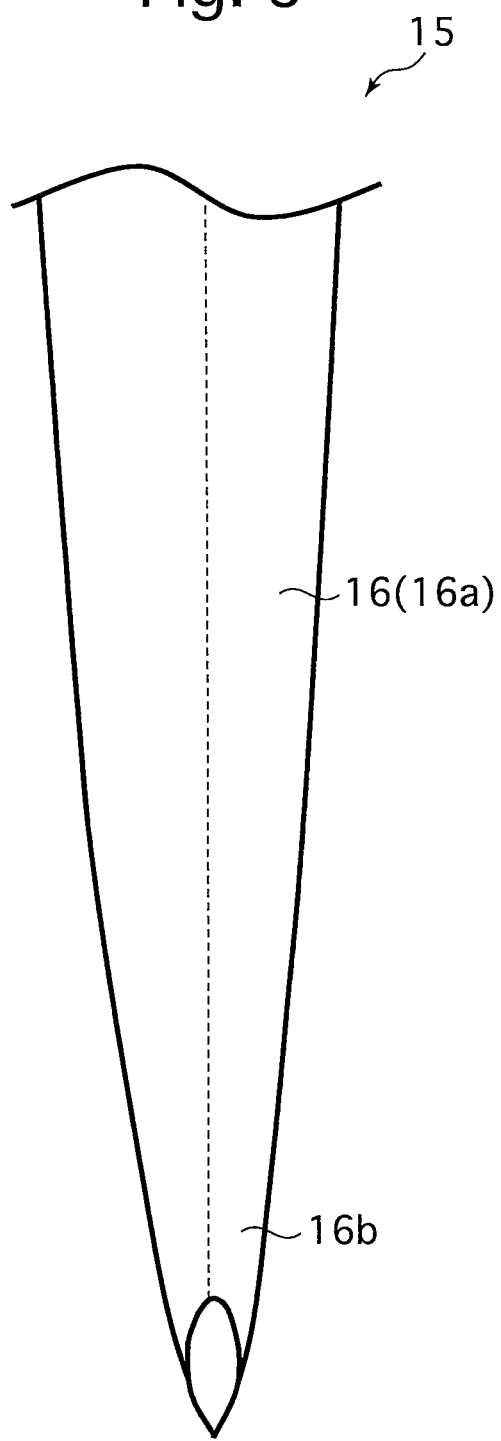
FIG. 5 is a view taken in the direction of an arrow B shown in FIG. 1, showing the structure of a single wind turbine blade.

As shown in FIGS. 2 and 3, the leading edge 16 is formed as a circular arc portion 16a in the shape of a circular arc in cross section in a plane orthogonal to the longitudinal direction of the wind turbine blade 15. In contrast, the trailing edge 17 is formed as an acute-angular portion 17a having an acute angular shape in cross section in a plane orthogonal to the longitudinal direction of the wind turbine blade 15. The cross-sectional shape of the shell portion 18 in a plane orthogonal to the longitudinal direction of the wind turbine blade 15 is substantially symmetrical with respect to a straight line connecting the leading edge 16 and the trailing edge 17. However, the shape of the shell portion 18 is not limited to this particular shape; various modifications to the design of the shell portion 18 are possible.

Upon viewing the entire cross sectional shape of the leading edge 16, the leading edge 16 is formed to have a progressively-varying cross sectional shape such that the thickness of the leading edge 16 in a cross section orthogonal to the longitudinal direction of the wind turbine blade 15 and the width of the leading edge 16 in the cross section from the leading edge 16 to the trailing edge 17 decrease progressively in a direction away from the rotational center of the wind turbine blade 15. In addition, as shown in FIGS. 2 through 5, the distal end of the leading edge 16 which is farthest from the rotational center of the wind turbine blade 15 is formed as a tapered distal end 16b such that the thickness of the tapered distal end 16b in a cross section orthogonal to the longitudinal direction of the wind turbine blade 15 and the width of the tapered distal end 16b in the cross section from the leading edge 16 to the trailing edge 17 relatively steeply narrow compared with a portion of the leading edge 16 closer to the rotational center of the wind turbine blade 15.

Figure 6:
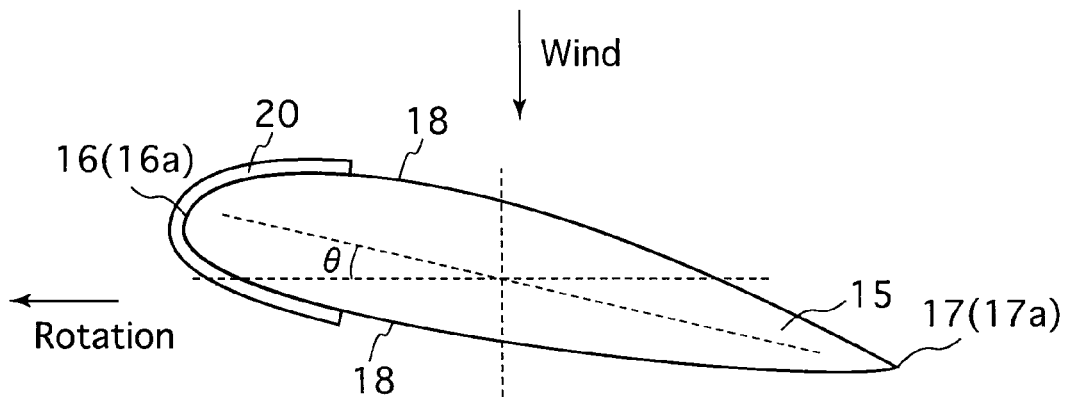
FIG. 6 is a sectional view corresponding to that of FIG. 2, showing the wind turbine blade to which a laminated protective sheet according to the present invention is bonded.
Figure 7:
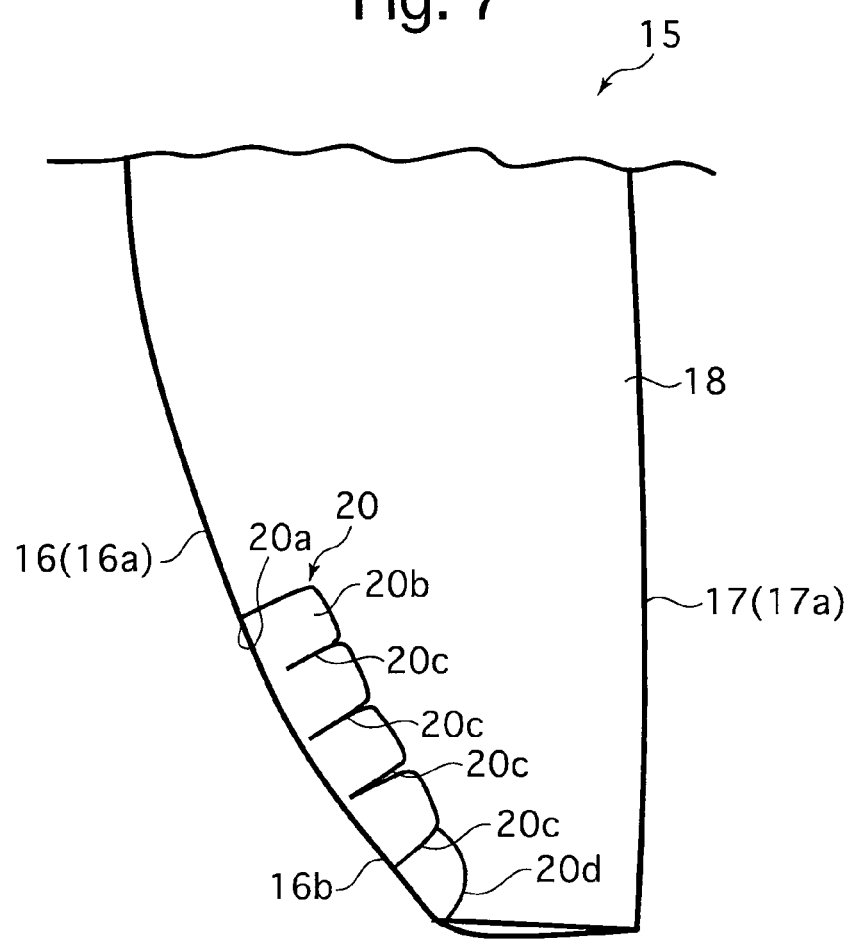
FIG. 7 is an enlarged view corresponding to that of FIG. 4, showing the portion "A" of the wind turbine blade to which the laminated protective sheet according to the present invention is bonded; however, since
Figure 8:
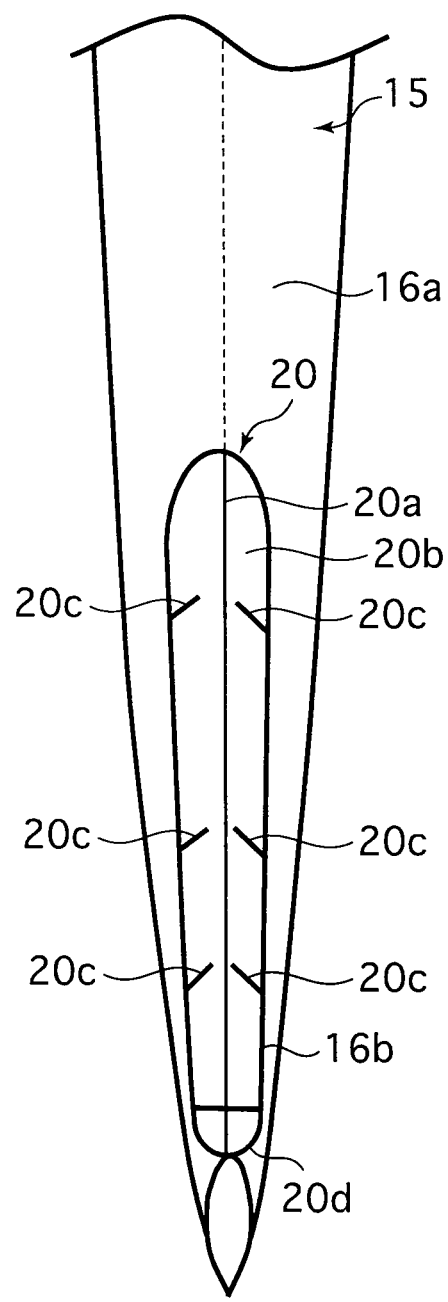
FIG. 8 is a view taken in the direction of the arrow B that corresponds to that of FIG. 5, showing the wind turbine blade to which the laminated protective sheet according to the present invention is bonded.

As shown in FIGS. 6 through 8, a laminated protective sheet 20 is cemented (bonded) to the tapered distal end 16b of the leading edge 16 of the FRP-made wind turbine blade 15 over the shell portion 18 that corresponds to each side of the wind turbine blade 15 (the wind-receiving surface and the back surface of the wind turbine blade 15 when it rotates) that extend toward the trailing edge 17 from the generating line of the circular arc portion 16a of the leading edge 16. More specifically, the laminated protective sheet 20 is provided with a body part 20b which is line-symmetrical with respect to a mountain fold along a center line 20a as shown in FIG. 8, and by folding the laminated protective sheet 20 so that the mountain fold is positioned along the generating line of the circular arc portion 16a, the laminated protective sheet 20 can be bonded so that the body part 20b extends over the shell portion 18 which corresponds to each side of the wind turbine blade 15 that extend from the generating line of the circular arc portion 16a toward the trailing edge 17. Here the term "the generating line of the circular arc portion 16a of the leading edge 16" means a line which passes the apex of the circular arc portion 16a of the leading edge 16 and extends in the longitudinal direction of the wind turbine blade 15 as viewed in a plane orthogonal to the longitudinal direction of the wind turbine blade 15. In FIG. 8, "the generating line of the circular arc portion 16a of the leading edge 16" is indicated by a dotted line. The tapered distal end 16b is a portion of the leading edge 16 which is subject to the harshest conditions out of the entire the leading edge 16 because air resistance caused by rotations of the wind turbine blade 15 when it rotates acts locally on the tapered distal end 16b; however, the tapered distal end 16b of the leading edge 16 can be protected in an efficient manner by bonding the laminated protective sheet 20 in the above described manner.

The body part 20b of the laminated protective sheet 20 is provided with slits 20c which are formed by cutting the body part 20b from both sides thereof toward the center line 20a. Due to the formation of the slits 20c, the laminated protective sheet 20 can be made to follow the shape of the tapered distal end 16b of the laminated protective sheet 20 with no gaps or wrinkles when bonded to the tapered distal end 16b. In addition, the laminated protective sheet 20 can be suitably bonded to a plurality of wind turbine blades 15, with the tapered distal ends 16b thereof being mutually different in shape.

Additionally, the present embodiment of the laminated protective sheet 20 is provided, at the distal end thereof that is farthest from the rotational center of the wind turbine blade 15, with a convex curved surface portion 20d in the shape of a curved surface, with a curved periphery generated as an arc about a point on the generating line of the circular arc portion 16a, which is convex toward the distal end of the laminated protective sheet 20 and which extends continuously over two sides of the wind turbine blade 15 toward the trailing edge 17 from the generating line of the circular arc portion 16a. This allows the pressure (wind power resistance) which is caused by airflow when the wind turbine blade 15 rotates to easily escape, thus making it possible to securely prevent the laminated protective sheet 20 from peeling off the tapered distal end 16b of the leading edge 16.

Figure 9:
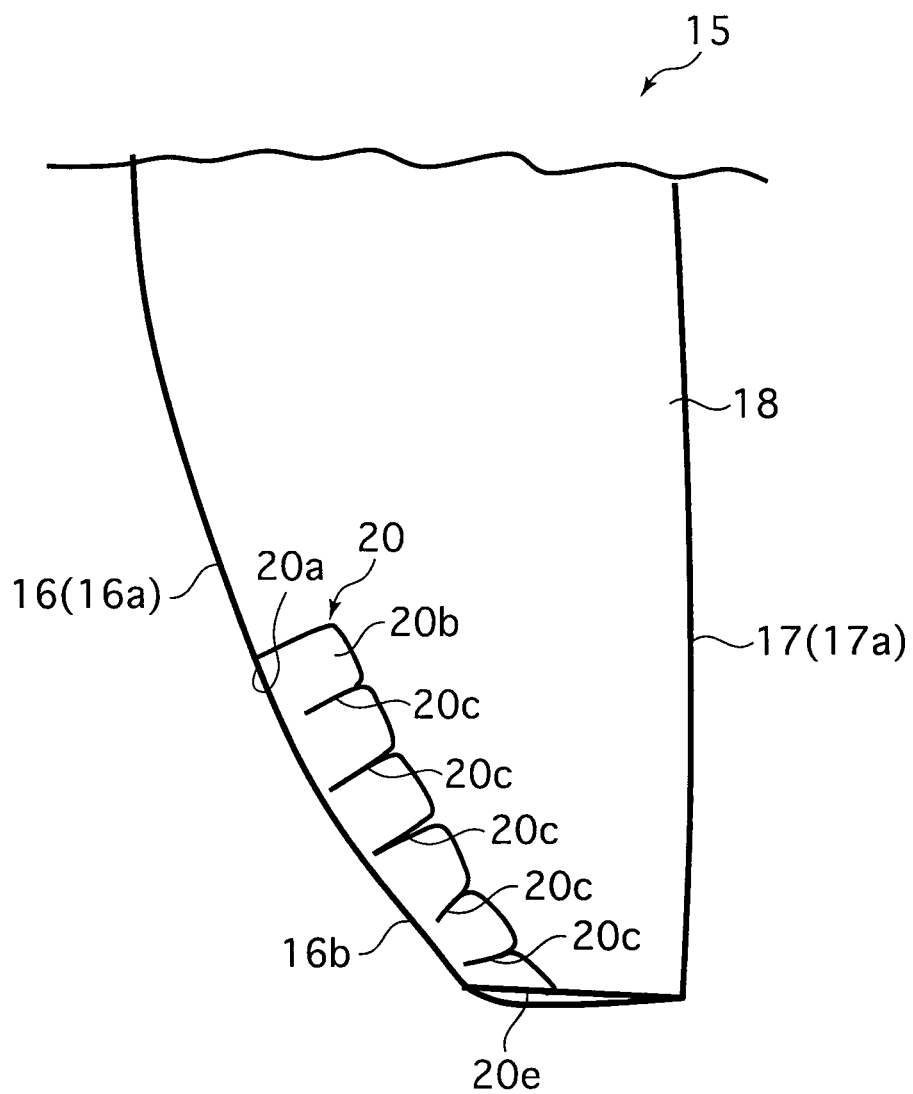
FIG. 9 is an enlarged view corresponding to that of FIG. 7, showing a modified embodiment of the shape of the distal end of the laminated protective sheet.
Figure 10:
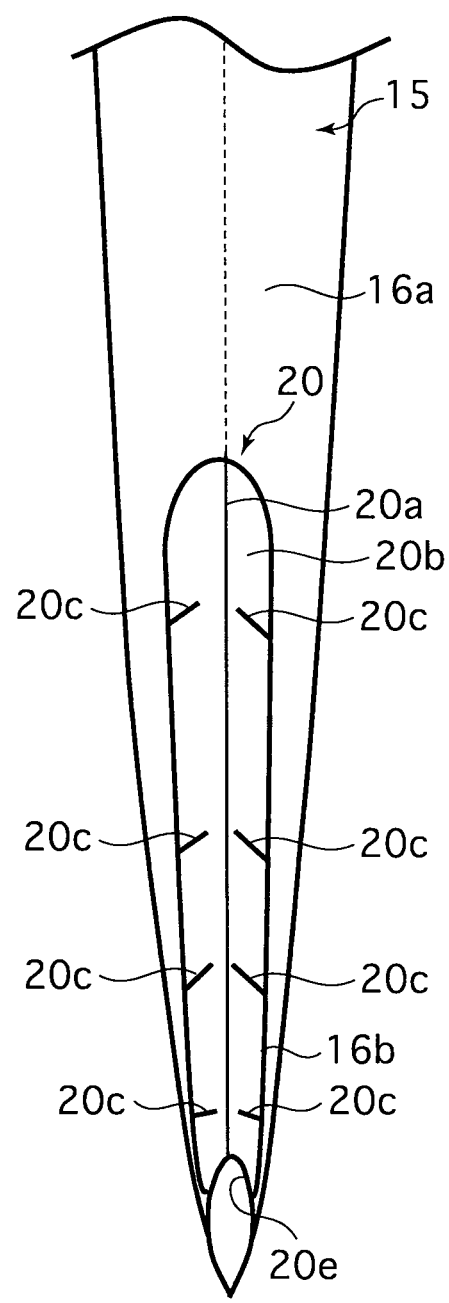
FIG. 10 is a view taken in the direction of an arrow B that corresponds to that of FIG. 8, showing a modified embodiment of the shape of the distal end of the laminated protective sheet.

FIGS. 9 and 10 show a modified embodiment of the shape of the distal end of the laminated protective sheet 20. The laminated protective sheet 20 in this modified embodiment is provided, at the distal end thereof farthest from the rotational center of the wind turbine blade 15, with a concave curved surface portion 20e in the shape of a curved surface which is concave toward the distal end of the laminated protective sheet 20 and which extends continuously over each side of the wind turbine blade 15 from the generating line of the circular arc portion 16a toward the trailing edge 17. This makes it possible to secure a large bonding area for the laminated protective sheet 20 to the wind turbine blade 15.

Figure 11:
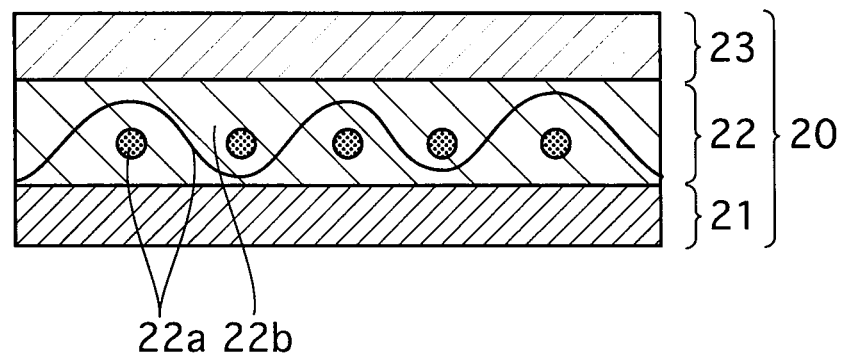
FIG. 11 is an enlarged sectional view of the laminated protective sheet for a blade according to the present invention.

FIG. 11 is a schematic diagram of the laminated protective sheet 20, showing the laminated structure thereof. The laminated protective sheet 20 has a laminated structure such that an intermediate fabric layer 22 and a durable surface layer 23 are laminated in that order on an adhesive layer 21 that is bonded to the wind turbine blade 15. The laminated protective sheet 20 has a cross section which is uniform in a direction perpendicular to the page in FIGS. 2, 3, 6 and 11.

The adhesive layer 21 is a rubber layer which includes isobutylene-isoprene rubber (IIR) as a rubber component. As a layer superior in adhesive property to a top coat layer or a gel coat layer which is formed on the surface of the GFRP-made wind turbine blade 15, it is desirable that the thickness of the adhesive layer 21 be in the range approximately from 0.5 to 1.0 mm to attain sufficient adhesive properties to the wind turbine blade 15. It is desirable that release paper be affixed to the surface of the adhesive layer 21 (the opposite surface of the adhesive layer 21 from the intermediate fabric layer 22).

The durable surface layer 23 consists of a rubber layer which includes hydrogenated acrylonitrile-butadiene rubber (hydrogenated nitrile rubber, HNBR) as a rubber component. This durable surface layer 23 that includes HNBR is superior in shock resistance, tracking resistance and ozone resistance, and there is little possibility of the durable surface layer 23 being damaged after a long period of time even if flying objects including hail hitting the durable surface layer 23 and even if the durable surface layer 23 is subject to the harshest of conditions in a natural environment. It is desirable that the thickness of the durable surface layer 23 be approximately 0.5±0.2 mm.

The intermediate fabric layer 22 that is positioned between the adhesive layer 21 and the durable surface layer 23 consists of a layer which includes a fabric 22a and a nitrile rubber (NBR) 22b with which the fabric 22a is impregnated. The intermediate fabric layer 22 has the role of preventing deviation between the durable surface layer 23 and the adhesive layer 21 from occurring when an impact is exerted on the durable surface layer 23. If this intermediate fabric layer 22 does not exist, deviation between the durable surface layer 23 and the adhesive layer 21 (wrinkles in the durable surface layer 23) or shear deformation (deformation by shearing strain) easily occurs in the adhesive layer 21 itself, which results in a lack of durability. It is desirable that the fabric 22a be made as a plain weave fabric. Although the fibers to be used are optional, for instance aramid fibers or nylon fibers can be used. The thickness of the intermediate fabric layer 22 is desirably approximately 0.3±0.05 mm.

The above-described durable surface layer 23, the intermediate fabric layer 22 and the adhesive layer 21 are separately formed into sheets, which are in turn bonded in layers into the laminated protective sheet 20. It is desirable that release paper be affixed to the surface of the adhesive layer 21 (the opposite surface of the adhesive layer 21 from the intermediate fabric layer 22). Affixing release paper to the surface of the adhesive layer 21 facilitates the handing of the laminated protective sheet 20, and the workability when the laminated protective sheet 20 is bonded to either the wind turbine blade 15 in advance or a damaged part of the wind turbine blade 15 after it is damaged. In addition, it is desirable that the release paper be divided into a linear portion and two body portions, wherein the linear portion extends along the center line 20a of the laminated protective sheet 20 while the body portions are respectively positioned on each side of the linear portion and correspond to the body part 20b of the laminated protective sheet 20. According to this structure, by firstly bonding the laminated protective sheet 20 to the generating line of the circular arc portion 16a with the center line 20a of the laminated protective sheet 20 being made to align with the generating line of the circular arc portion 16a after peeling off the linear portion of the release paper and subsequently bonding the body part 20b of the laminated protective sheet 20 to the shell portion 18 with the laminated protective sheet 20 (the adhesive layer 21) being mountain-folded along the generating line of the circular arc portion 16a after peeling off the body portions of the release paper, the body part 20b can be bonded over the shell portion 18, which corresponds to each side of the wind turbine blade 15 that extend toward the trailing edge 17 from the generating line of the circular arc portion 16a. Note that a sealing tape can be affixed to an uneven surface created between the wind turbine blade 15 and the laminated protective sheet 20 (the body part 20b) at the edge of the laminated protective sheet 20 (the body part 20b).

Figure 12:
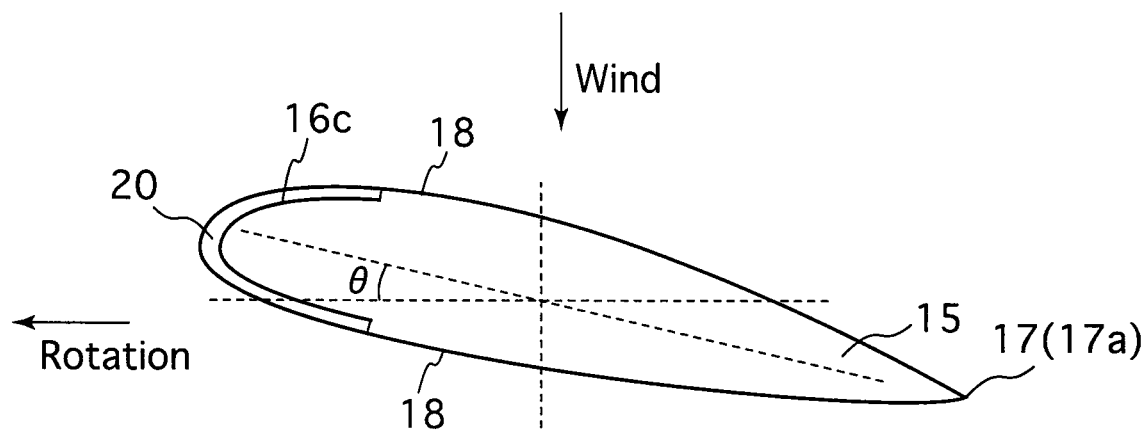
FIG. 12 is a sectional view corresponding to that of FIG. 6, showing another embodiment of the wind turbine blade according to the present invention.

FIG. 12 shows another embodiment of the wind turbine blade 15 according to the present invention. In this other embodiment of the wind turbine blade 15, a laminated protective sheet holding recess 16c which corresponds in shape to the laminated protective sheet 20 and has a depth substantially identical to the thickness of the laminated protective sheet 20 is formed in the tapered distal end 16b to allow the laminated protective sheet 20 to be positioned in the laminated protective sheet holding recess 16c and bonded therein. This structure almost eliminates the unevenness created by the thickness of the laminated protective sheet 20, thus making it possible to prevent the laminated protective sheet 20 from peeling which may be caused by the pressure (wind power resistance) caused by airflow when the wind turbine blade 15 rotates.

In the above described embodiments, the case has been illustrated where the laminated protective sheet 20, which has a three-layer structure consisting of the adhesive layer 21, the intermediate fabric layer 22 and the durable surface layer 23, is bonded to the outer surface of the tapered distal end 16b of the leading edge 16 of the wind turbine blade 15 over two sides of the wind turbine blade 15 toward the trailing edge 17 from the generating line of the circular arc portion 16a.

However, as far as the use of the laminated protective sheet 20, which has a three-layer structure consisting of the adhesive layer 21, the intermediate fabric layer 22 and the durable surface layer 23, is concerned, the bonding site to which the laminated protective sheet 20 is to be bonded is not limited to the outer surface of the tapered distal end 16b of the leading edge 16. For instance, even in the case where the laminated protective sheet 20 is bonded to the entire part of the leading edge 16 of the wind turbine blade 15 or only a portion of the distal end side of the wind turbine blade 15 that is high in peripheral speed, a certain degree of blade protection effect is obtained.

In addition, in regard to the laminated protective sheet 20 being bonded to the outer surface of the tapered distal end 16b of the leading edge 16 of the wind turbine blade 15 over two sides of the wind turbine blade 15 toward the trailing edge 17 from the generating line of the circular arc portion 16a, the structure of the laminated protective sheet 20 is not limited to the three-layer structure consisting of the adhesive layer 21, the intermediate fabric layer 22 and the durable surface layer 23. For instance, a certain degree of blade protection effect is obtained even in the case where the intermediate fabric layer 22 is omitted, i.e., even in the case where a laminated protective sheet having two-layer structure consisting of the adhesive layer 21 and the durable surface layer 23 is bonded.

Specific examples will be discussed hereinafter.

Practical Example Laid Open in This Application (1) Materials of the Wind Turbine Blade (Test Piece) 15

The materials of the wind turbine blade 15 include a gel coat on the surface of the wind turbine blade 15 and a GFRP resin provided as a layer under the gel coat.

(2) Materials and Thickness of the Durable Surface Layer 23

The durable surface layer 23 is formed by kneading a combination of unvulcanized HNBR with an additive agent and a curing agent and producing a 0.45 mm thick unvulcanized rubber sheet therefrom.

(3) Materials, Fibers and Thickness of the Intermediate Fabric Layer 22

The intermediate fabric layer 22 impregnated with nitrile rubber is obtained by immersing a fabric consisting of a 0.3 mm thick plain weave fabric (yarn size=70 denier; thread count=100 to 120/inch) made of aramid fibers in a rubber solution made of nitrile rubber dissolved in toluene, and thereafter removing this toluene by air-drying this fabric. Subsequently, after the durable surface layer 23, which is formed from the unvulcanized rubber sheet produced in the above (2), is laminated to the intermediate fabric layer 22, a laminated body consisting of the durable surface layer 23 and the intermediate fabric layer 22 is obtained by heating the durable surface layer 23 and the intermediate fabric layer 22, which are thus laminated to each other, for 2 hours at 160 degrees C.

(4) Materials and Thickness of the Adhesive Layer 21

The adhesive layer 21 is formed by applying a coating of an adhesive comprising butyl rubber as a rubber component to one side (the test piece side) of the laminated body produced in (3) above that consists of the durable surface layer 23 and the intermediate fabric layer 22 so that the thickness of the adhesive when dry is 0.5±0.2 mm to thereby produce the laminated protective sheet 20.

Subsequently, comparative examples for proving superiority of the practical example will be discussed hereinafter.

Comparative Example 1 (Without Intermediate Fabric Layer)

As a copy of a typical protective rubber sheet available on the market, a laminated protective sheet having no intermediate fabric layer is made by forming a durable surface layer in a similar manner to the above described practical example and subsequently applying an adhesive to one side (the test piece side) of the durable surface layer.

Comparative Example 2 (Durable Surface Layer Made of EP Rubber)

In a manner similar to that of the above described practical example except that ethylene propylene rubber (EP rubber), as a rubber component, is used as the durable surface layer, a laminated protective sheet which includes the ethylene-propylene-rubber durable surface layer, the intermediate fabric layer and the adhesive layer is formed.

Endurance tests (air cannon tests) were carried out on the above described practical example, comparative examples 1 and 2, and a wind turbine blade (standard material) to which no laminated protective sheet was affixed. In the air cannon test, hard resin balls (46 grams in weight; approximately 43 mm in diameter) were successively made to impact a wind turbine blade test piece, to which the laminated protective sheet was affixed (in the case of the practical example, and comparative examples 1 and 2) or not affixed (in the case of the standard material), at a speed of approximately 70 meters per second, and the change in appearance of the impacted area was observed. As a result of these observations, surface damage was confirmed upon impacting the standard material 850 times with balls, occurrence of delamination and wrinkles was confirmed upon impacting comparative example 1 1,000 times with balls, and rupture of the surface layer was confirmed upon impacting comparative example 2 1,000 times with balls; whereas, on the practical example it was confirmed that no abnormalities such as surface damage or delamination occurred even after impacting the practical example 1,500 times with balls.

INDUSTRIAL APPLICABILITY

A blade and a laminated protective sheet for the blade according to the present invention are suitably used for, e.g., wind turbine blades of a wind turbine generator.

REFERENCE SIGNS LIST

10 Wind turbine generator
15 Wind turbine blade (blade/blade body)
16 Leading edge
16a Circular arc portion
16b Tapered distal end
16c Laminated protective sheet holding recess
17 Trailing edge
17a Acute-angular portion
18 Shell portion
20 Laminated protective sheet
20a Center line
20b Body part
20c Slit
20d Convex curved surface portion
20e Concave curved surface portion
21 Adhesive layer
22 Intermediate fabric layer
22a Fabric
22b Nitrile rubber (NBR)
23 Durable surface layer

The invention claimed is:

1. A blade comprising:
an FRP blade body with a leading edge that has a circular arc shape in a cross section orthogonal to a longitudinal direction of said blade body, wherein a distal end of said leading edge, which is farthest from a rotational center of said blade body, comprises a tapered distal end, having a narrowing thickness in cross section orthogonal to said longitudinal direction of said blade body and having a narrowing width in said cross section from said leading edge to a trailing edge of said blade body; and
a laminated protective sheet being bonded to at least said tapered distal end of said leading edge of said blade body, over two sides thereof that extend toward said trailing edge from a generating line of said arc-shaped cross section,
wherein said laminated protective sheet comprises an adhesive layer, a intermediate fabric layer and a durable surface layer, in that order from the blade body side, and
wherein a distal end of said laminated protective sheet that is farthest from said rotational center of said blade body is in the shape of a curved surface which is convex toward said distal end of said laminated protective sheet and which extends continuously over said two sides of said blade body, and a curved periphery of said convex curved surface is formed as an arc about a point on said generating line.

2. The blade according to claim 1, wherein said laminated protective sheet comprises a slit for making said laminated protective sheet follow a shape of said tapered distal end with no gaps or wrinkles when bonded to said tapered distal end.

3. The blade according to claim 1, wherein a laminated protective sheet holding recess, which corresponds in shape to said laminated protective sheet and has substantially the same depth as a thickness of said laminated protective sheet, is formed at said tapered distal end of said blade body, said laminated protective sheet being positioned in said laminated protective sheet holding recess and bonded therein.

4. The blade according to claim 1, wherein said durable surface layer includes a rubber layer which includes hydrogenated acrylonitrile-butadiene rubber as a rubber component.

5. The blade according to claim 4, wherein said durable surface layer is approximately 0.5.+−.0.2 mm in thickness.

6. The blade according to claim 1, wherein said intermediate fabric layer includes a layer made of a fabric impregnated with nitrile rubber.

7. The blade according to claim 6, wherein said intermediate fabric layer is approximately 0.3.+−.0.05 mm in thickness.

8. The blade according to claim 1, wherein said adhesive layer includes a rubber layer which includes butyl rubber as a rubber component.

9. A laminated protective sheet comprising:
an adhesive layer;
an intermediate fabric layer; and
a durable surface layer,
in that order from a blade body side of said laminated protective sheet, which is for a blade and is bonded at the blade body side to a surface of an FRP blade body,
wherein a leading edge of said blade body has a circular arc shape in a cross section orthogonal to a longitudinal direction of said blade body,
wherein a distal end of said leading edge, which is farthest from a rotational center of said blade body, includes a tapered distal end, having a narrowing thickness in cross section orthogonal to said longitudinal direction of said blade body and having a narrowing width in said cross section from said leading edge to a trailing edge of said blade body,
said laminated protective sheet being bonded to said tapered distal end of said leading edge of said blade body over two sides thereof that extend toward said trailing edge from a generating line of said arc-shaped cross section, and a distal end of said laminated protective sheet that is farthest from said rotational center of said blade body being in the shape of a curved surface which is convex toward said distal end of said laminated protective sheet and which extends continuously over said two sides of said blade body, a curved periphery of said convex curved surface being formed as an arc about a point on said generating line.

10. The laminated protective sheet for a blade according to claim 9, comprising a slit for making said laminated protective sheet follow a shape of said tapered distal end with no gaps or wrinkles when said laminated protective sheet is bonded to said tapered distal end.

11. The laminated protective sheet for a blade according to claim 9, wherein said durable surface layer includes a rubber layer which includes hydrogenated acrylonitrile-butadiene rubber as a rubber component.

12. The laminated protective sheet for a blade according to claim 11, wherein said durable surface layer is approximately 0.5.+−0.0.2 mm in thickness.

13. The laminated protective sheet for a blade according to claim 9, wherein said intermediate fabric layer includes a layer made of a fabric impregnated with nitrile rubber.

14. The laminated protective sheet for a blade according to claim 13, wherein said intermediate fabric layer is approximately 0.3.+−.0.05 mm in thickness.

15. The laminated protective sheet for a blade according to claim 9, wherein said adhesive layer includes a rubber layer which includes butyl rubber as a rubber component.

* * * * *